United States Patent [19]
Ansell et al.

[11] Patent Number: 5,943,857
[45] Date of Patent: *Aug. 31, 1999

[54] DIESEL ENGINE EXHAUST GAS PURIFICATION METHOD

[75] Inventors: Graham Paul Ansell, Twyford; Janet Mary Fisher, Calcot; Peter Geoffrey Gray, Sonning Common; Hugh Gavin Charles Hamilton, Caversham; Raj Rao Rajaram, Slough, all of United Kingdom

[73] Assignee: Johnson Matthey Public Limited Company, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/952,482

[22] PCT Filed: Jun. 5, 1996

[86] PCT No.: PCT/GB96/01322

§ 371 Date: Nov. 19, 1997

§ 102(e) Date: Nov. 19, 1997

[87] PCT Pub. No.: WO96/39244

PCT Pub. Date: Dec. 12, 1996

[30] Foreign Application Priority Data

Jun. 6, 1995 [GB] United Kingdom .................. 9511412

[51] Int. Cl.[6] ........................................................ F01N 3/00
[52] U.S. Cl. ................................. 60/274; 60/297; 60/301
[58] Field of Search ............................. 60/297, 301, 284, 60/274

[56] References Cited

U.S. PATENT DOCUMENTS 3,699,683 10/1972 Tourtellotte et al. ..................... 60/274
4,934,142 6/1990 Hayashi et al. ........................... 60/297
5,051,244 9/1991 Dunne et al. ........................... 423/212
5,078,979 1/1992 Dunne .................................... 423/212
5,125,231 6/1992 Patil et al. ............................... 60/297
5,142,864 9/1992 Dunne ..................................... 60/274
5,269,140 12/1993 Take et al. .............................. 60/274
5,354,720 10/1994 Leyrer et al. ........................... 502/64
5,388,406 2/1995 Takeshima et al. ...................... 60/297
5,407,880 4/1995 Ikeda et al. ............................. 502/67
5,473,887 12/1995 Takeshima et al. ...................... 60/297
5,531,068 7/1996 Kass et al. ............................... 60/297
5,603,215 2/1997 Sung et al. ............................... 60/297

FOREIGN PATENT DOCUMENTS

0559021A2  9/1993  European Pat. Off. .
0584737A1  3/1994  European Pat. Off. .
0716877A1  6/1996  European Pat. Off. .
1407772    9/1975  United Kingdom .
96/01322   9/1996  United Kingdom .
WO94/22564 10/1994 WIPO .

Primary Examiner—Thomas E. Denion
Attorney, Agent, or Firm—Ratner & Prestia

[57] ABSTRACT

A process for the improved conversion of $NO_x$ in the exhaust gases from a light diesel engine using lean $NO_x$ catalyst converter in the exhaust system. The process is characterized in that unburned hydrocarbons are adsorbed into an adsorbent in the catalytic converter at temperatures below 190° C. during cooler parts of the operating cycle, and are desorbed in the temperature range of 198° to 200° C. during hotter parts of the operating cycle. The desorbed hydrocarbons are combined with unburned hydrocarbons in the exhaust to form a composition stream having a higher amount of hydrocarbons than either constituent stream which are then oxidized at the same time as at least a portion of the $NO_x$ is catalytically reduced to form $N_2$.

5 Claims, 6 Drawing Sheets

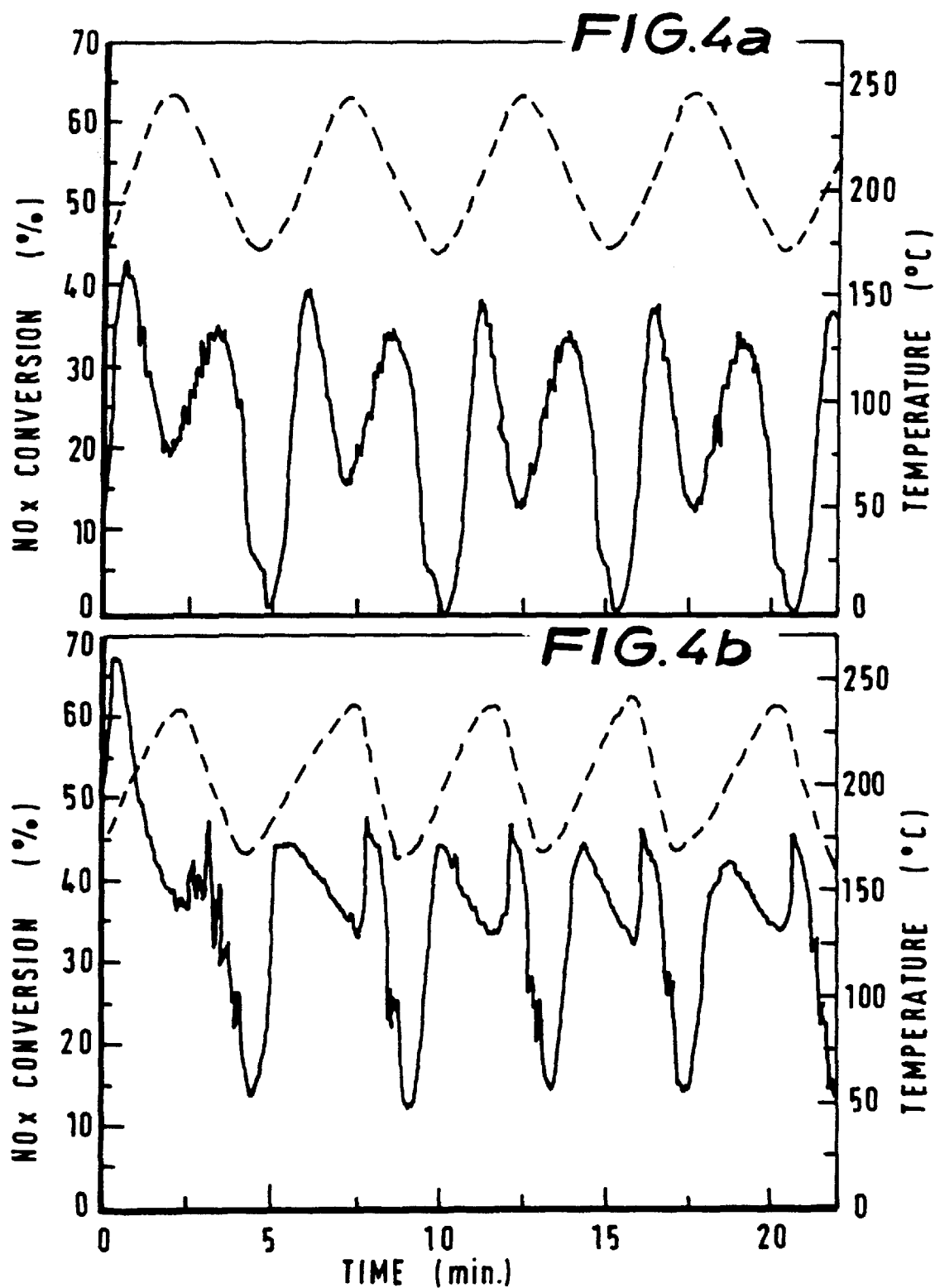

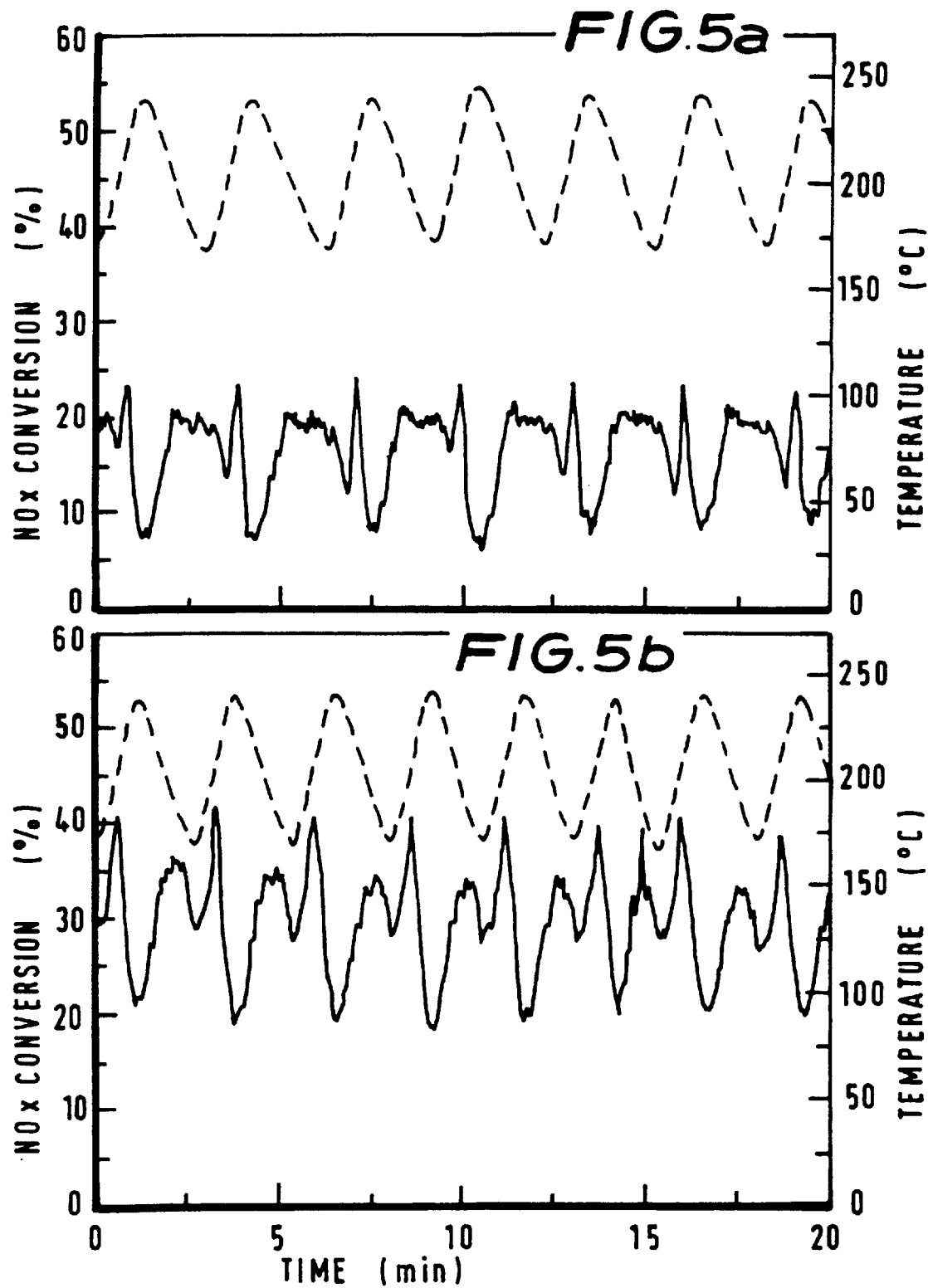

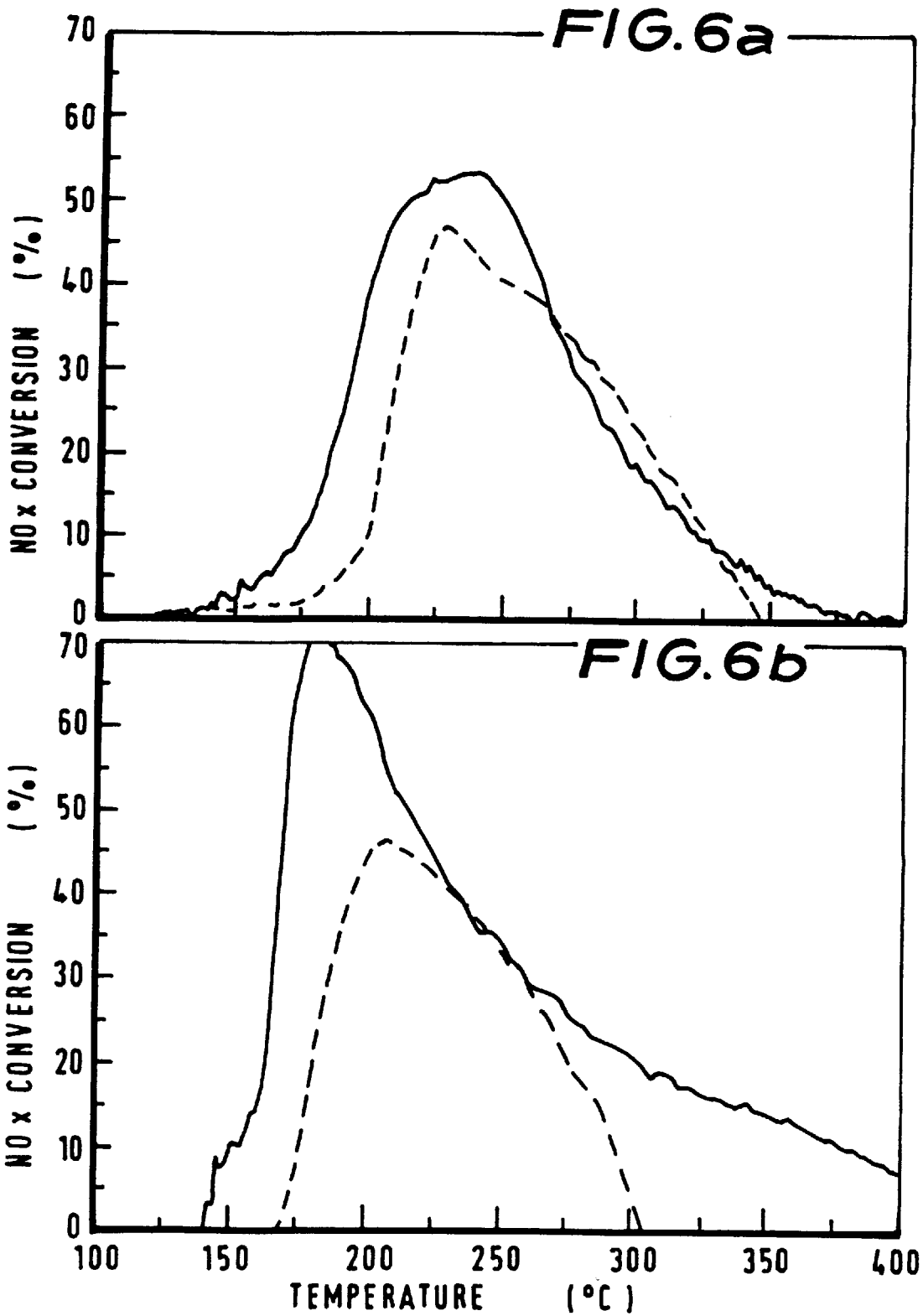

DIESEL ENGINE EXHAUST GAS PURIFICATION METHOD

This application is the U.S. national phase application of PCT International Application PCT/GB96/01322.

BACKGROUND OF THE INVENTION

The present invention concerns improvements in emission control, more especially, it concerns improvements in the control of regulated emissions from diesel engines.

Light duty diesels, for example those of up to about 2.5 liter capacity used in private cars and light vans, show much better fuel economy and hydrocarbon emissions than gasoline engines and are increasing in number. Emissions from diesel engines are now being regulated by legislation, and whilst hydrocarbon emissions do not present a problem in meeting emission limits, NOx is problematical. Since the exhaust gases from lean-burn engines such as diesels are high in oxygen content throughout the cycle of operation, it is more difficult to reduce NOx to $N_2$. A contribution to this problem is the low exhaust gas temperature in comparison to gasoline-fuelled engines, which can also vary quite dramatically according to operating conditions. Thus, for a state of the art diesel exhaust catalyst system, 50% of hydrocarbons are oxidised at a temperature in the range 190 to 250° C., and this inclines to 100% at higher temperatures. The conversion of NOx, however, shows very different characteristics, with a marked peak, creating a "window" of conversion at the 30 to 60% level, at a range of temperatures depending upon the catalyst system and engine system. This is illustrated in accompanying FIG. 1. As mentioned, the exhaust gas temperature will vary over a test cycle, so that the catalyst is seldom at a suitable temperature for optimum conversion. Over a test cycle therefore, the cumulative conversion efficiency for diesel NOx may only be about 10%. In fact, as the catalyst temperature drops below the peak conversion temperature for NOx, the temperature is also below "light off" for HC conversion. Accordingly, most of the unburnt hydrocarbons go out the tail pipe unreacted, along with unconverted NOx. It is to be noted that the exhaust temperature with heavy duty diesels is much higher and therefore these do not face quite the same problems. Nonetheless, the present invention offers improvements in emission control particularly during start-up of heavy duty diesel engines, and offers the potential to control emissions to meet expected future regulations.

SUMMARY OF THE INVENTION

It is an aim of the present invention to provide a diesel engine system capable of a substantial reduction in emissions of NOx, especially but not exclusively from light duty diesel engines.

Herein, diesel engines are those fuelled by fuel oil of the type often known as "gas-oil". The invention may also be applied to diesel compression ignition engines fuelled by other fuels including oxygenated fuels.

We would mention GB Patent 1407772 (Nissan), which concerns an internal combustion engine fitted with a three-way catalyst, and teaches a complicated system which includes supplying additional fuel into the exhaust upstream of the catalyst, in order to assist in the reduction of NOx to $N_2$. The skilled person considers that the teaching of this patent is only relevant to gasoline-fuelled engines. There is no suggestion that unburnt fuel may be collected from the exhaust gas instead of the supply of additional fuel upstream of the catalyst.

WO 94/22564 (Engelhard) describes a catalyst composition for treating diesel engine exhausts, comprising a ceria component and a catalytically active amount of a zeolite. The purpose of this catalyst composition is stated to be the oxidation of volatile fractions, and the catalyst is operated under oxidising conditions, and is completely unconcerned with levels of NOx.

The present invention provides a diesel engine system which exhibits a higher exhaust gas temperature and a lower exhaust gas temperature, said lower temperature being insufficient for significant catalytic conversion of NOx to $N_2$, and a lean NOx catalyst system comprising lean NOx catalyst and an adsorbent for unburnt fuel, arranged and constructed so that during the lower exhaust gas temperature parts of the engine operating cycle, the adsorbent adsorbs unburnt fuel, and during the higher exhaust gas temperature parts of the operating cycle, the adsorbent releases unburnt fuel, which combined with unburnt fuel in the exhaust gas, is effective to increase the conversion of NOx.

The invention further provides a method of increasing the conversion of NOx in a diesel engine fitted with a catalyst system, which catalyst system comprises a lean NOx catalyst and an adsorbent for unburnt fuel, comprising permitting said adsorbent to adsorb unburnt fuel from the exhaust gases, during parts of the engine operating cycle in which the exhaust gases are cooler and permitting said adsorbent to desorb unburnt fuel during parts of the operating cycle in which the exhaust gases are hotter, whereby the conversion of NOx is increased in aggregate over a total operating cycle.

It is recognised that the use of adsorbent has been recommended for gasoline engines. However, the emission characteristics of gasoline engines are very different from those of diesel engines. In particular, unburnt fuel is particularly a problem during cold starts of gasoline engines, that is before the catalyst lights off. Unburnt fuel emissions from the first few minutes of operation may dominate the aggregate emissions over a test cycle. Accordingly, for gasoline engines, an adsorbent acts to adsorb unburnt fuel during cold start, and releases it once the catalyst has reached light-off, for oxidation. After light-off there is no actual need for the adsorbent, especially as the gasoline engine and catalyst system does not cycle significantly through cooler parts of the operating cycle during operation. Since diesel engines do not have any great difficulty meeting the regulated emission levels for unburnt fuel, there is no reason to use an adsorbent to reduce hydrocarbon levels in exhaust gases. In the present invention, the adsorbent is used to accumulate hydrocarbon in order to reduce NOx emissions during parts of the operating cycle, and we believe this to be a wholly novel concept. The characteristic cycling of exhaust gas temperature in diesel engines during FTP or ECE tests is important to the operation of the present invention. If the exhaust gas was at "steady state" the adsorbent would eventually saturate and there would not be an overall improvement in NOx conversion. The cycling permits the adsorbent to adsorb unburnt fuel during the cool part of the cycle when there would be little catalytic conversion of NOx and to desorb unburnt fuel during the hotter part of the cycle (simultaneously regenerating the adsorbent), in order to convert NOx when the catalyst is at a higher temperature.

It will be readily understood by the skilled man that "hotter" and "cooler" or equivalent terminology used herein is with reference to the average exhaust gas temperature, and that there are clear cycles from lower temperatures to higher temperatures during emission tests. These cycles are shown in accompanying FIG. 2. Desirably, the adsorbed fuel is desorbed during maximum conversion of NOx to $N_2$, which is, for most state-of-the-art Pt-containing lean-NOx catalysts, at catalyst temperatures of from 190 to 250° C.

The adsorbent may be any adsorbent capable of reversibly adsorbing the particular fuel or unburnt by-products under operating conditions, and may conveniently be a zeolite. There are a variety of zeolites which are capable of performing this duty, including non-metallised zeolite such as ZSM-5, ion-exchanged or metal impregnated ZSM-5, and zeolite in which the silica to alumina ratio is very high, such as silicalite. Metallised or non-metallised zeolite, eg mordenite, Y and β zeolite may be used. It may be desirable to incorporate a metal, especially cobalt, platinum or one of the other platinum group metals, or a rare earth, in the adsorbent, and in some cases, this may improve cleaning of the adsorbent surface during regeneration. The particle size and pore size may be adjusted or chosen in order to improve trapping and release characteristics for the hydrocarbon molecules. Combinations of zeolites may also be beneficial.

The catalyst chosen may be one of the class generally known as diesel catalysts, or lean NOx catalysts, and may be, for example, a Pt on an alumina, alumina-zirconia, zirconia, sulphated zirconia, silica-alumina, silica, titania, silica-titania or tin oxide-alumina support system. The Pt may be combined with another catalytic or promoting metal, eg Pt—Co, Pt—Ru, Pt—Ir, Pt—Rh or Pt—Pd, on any of the above supports or on a zeolite, eg ZSM-5. Other lean NOx catalysts such as Cu on ZSM-5 may be used, and the exact nature is not believed to be critical to the operation of the present invention.

The catalyst is preferably carried on a catalyst support substrate, eg a metal or, preferably, a ceramic monolith of the honeycomb flow-through type, and may be on a separate monolith from the adsorbent. It may be desirable, however, that both catalyst and adsorbent are deposited on the same monolith. Suitably, for example, a standard cordierite monolith is washcoated with a slurry of high surface area alumina, then is dried and fired. The coated monolith may then be impregnated with catalytically active components, eg a solution of one or more platinum group metal salts or compounds, and dried and fired. An outermost layer of adsorbent may be applied by washcoating with a slurry of the adsorbent together with a supplemental adherence modifier such as a colloidal silica material, eg that known as "Ludox". The adsorbent may, for example, form 67% by weight, on a dry basis, of the slurry, and the silica material forms 33% by weight, on a dry basis. It may be necessary to apply each washcoat several times, in order to obtain the optimum loading for the particular system. Alternatively, a similar coating and impregnation may be used to apply the adsorbent to the washcoated monolith, then a further washcoat of alumina before the catalyst is applied as the outermost layer. If desired, the adsorbent and catalyst may be applied in a single, mixed layer. The skilled man may adapt the invention as described herein without departing from the inventive scope.

BRIEF DESCRIPTION OF THE DRAWING

The nature of the present invention will be better appreciated with reference to the accompanying drawings, in which

FIGS. 3 to 6 are traces of NOx conversion in a simulated engine operation.

DETAILED DESCRIPTION OF THE INVENTION

Figure 1:
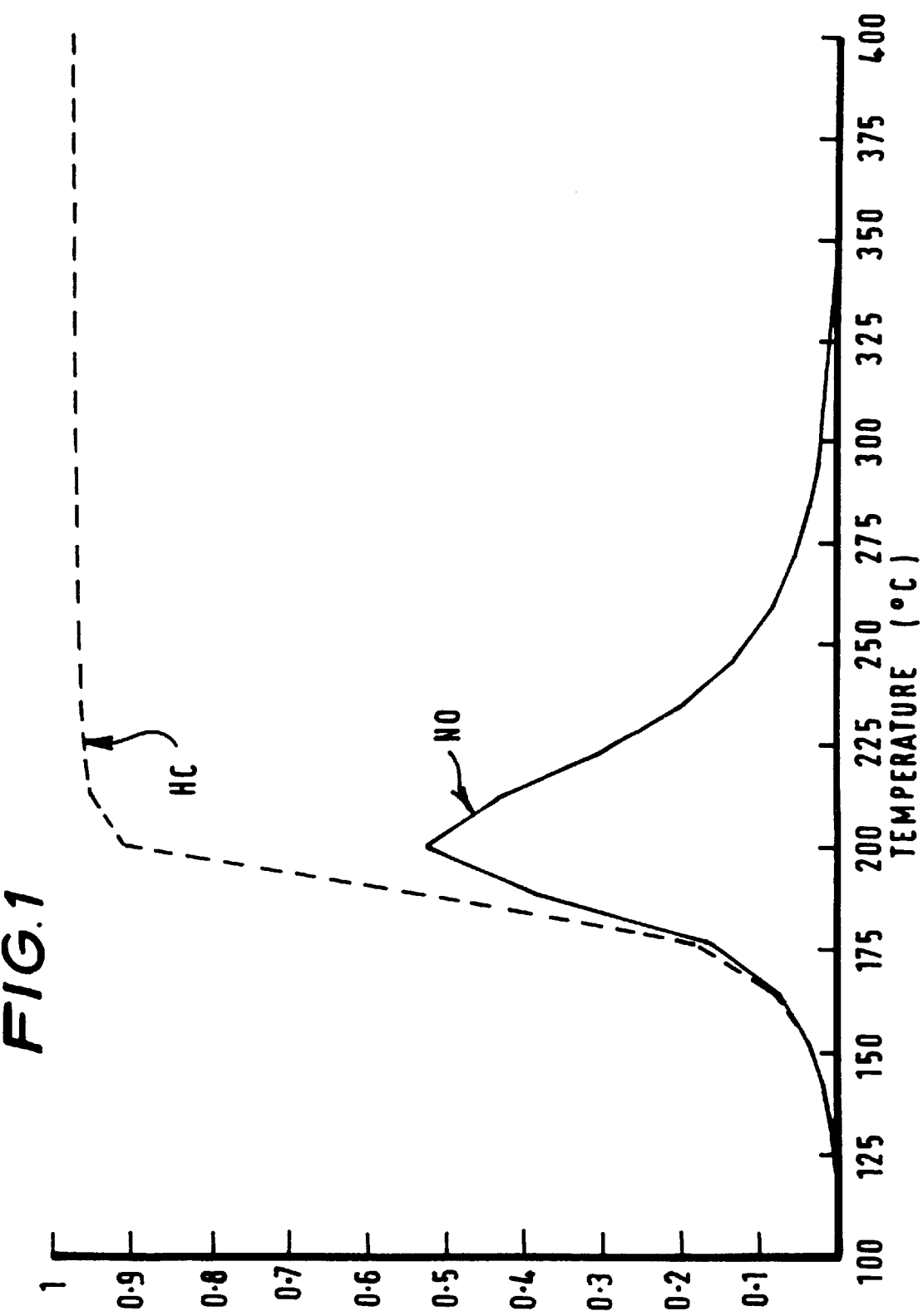
FIG. 1 is an illustration of HC and NO conversion over a catalyst plotted against gas temperature.

Referring to FIG. 1, it can be seen that NO conversion reaches a sharp peak at about 200° C. Over much of the temperature range, NO conversion was below 10%. At peak NO conversion, the conversion of HC is less than maximal.

Figure 2:
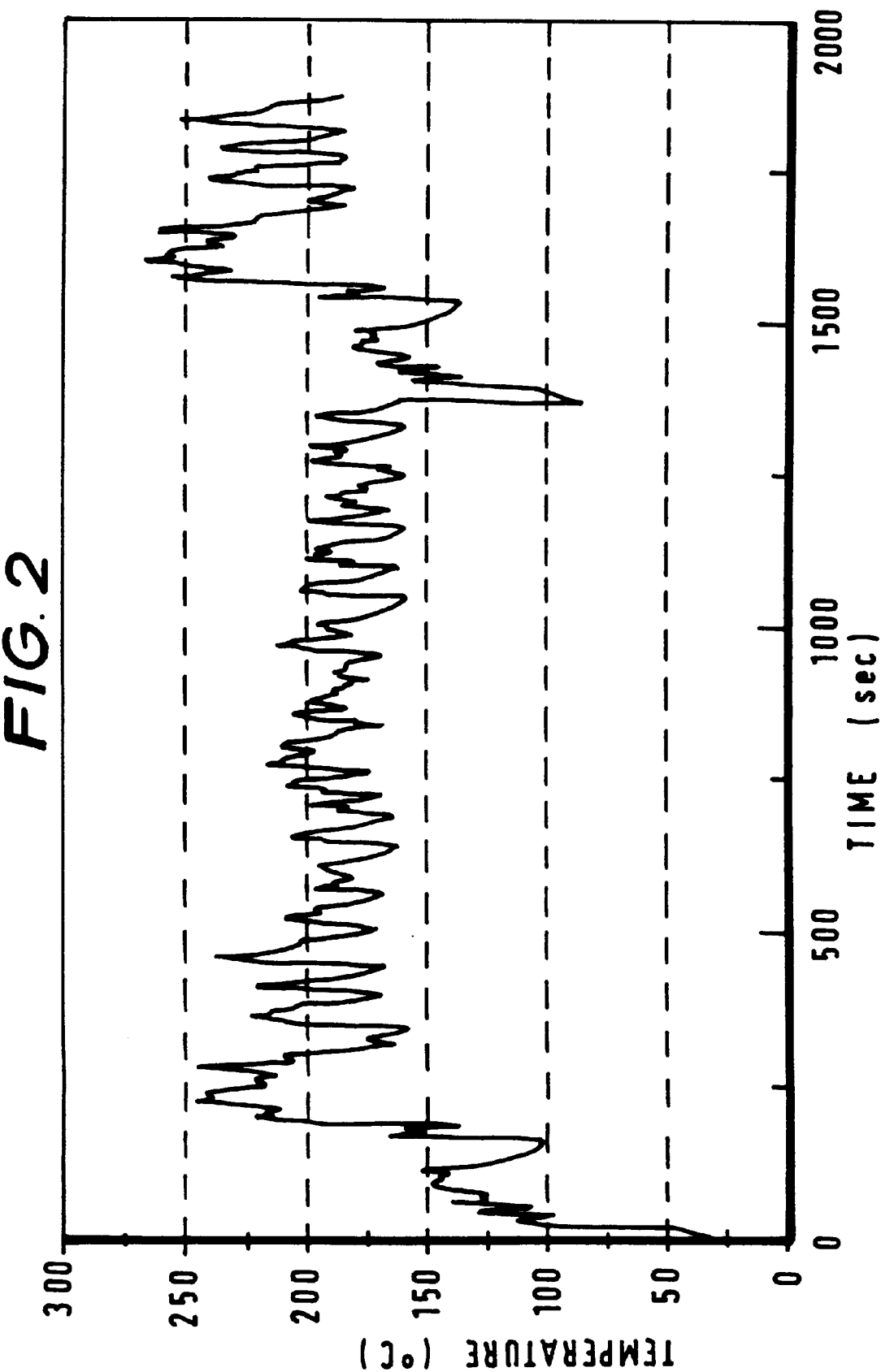
FIG. 2 illustrates the gas temperature at the inlet to a catalyst in a diesel VolksWagen Golf on the FTP test cycle.

Considering the FTP plot (FIG. 2) it can be seen that much of the time, the gas temperature at the inlet to the monolith is between 150 and 200° C., during which there is very low conversion of NO and HC.

Figure 3:
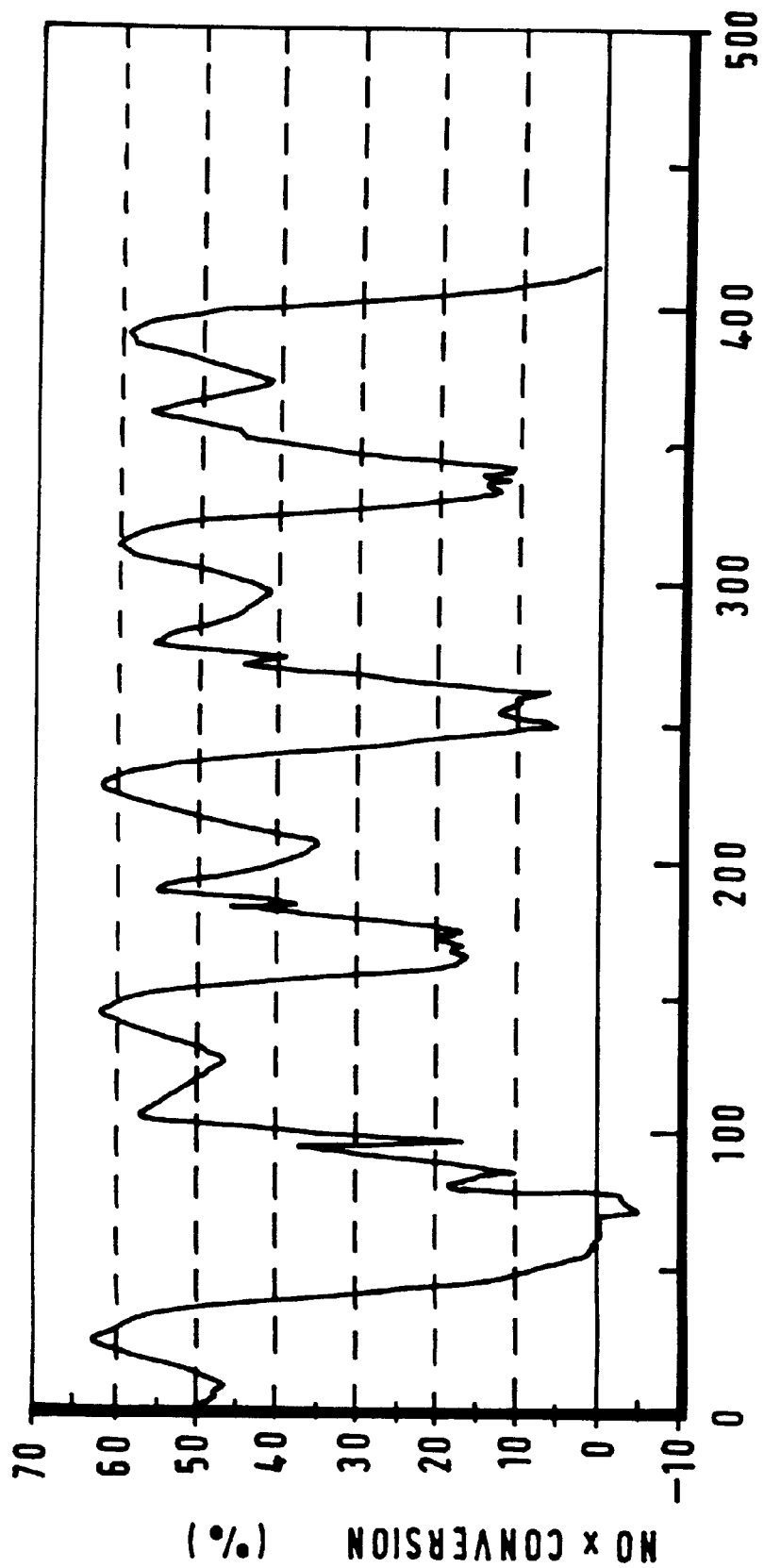

FIG. 3 represents the results from testing a model diesel exhaust gas (400 ppm NOx, 800 ppm $C_3H_6$, 12% $O_2$ balance $N_2$) in a transient test rig which modelled exhaust gas temperatures according to a cycle typical of the middle section ("cold stabilised") of a FTP test cycle. The exhaust gas was fed to a catalyst system according to the invention, composed of a commercial diesel catalyst (1 part by weight) admixed with zeolite ZSM-5 (1 part by weight). A peak NOx conversion of about 60% was observed, compared to a peak of about 30% for a control experiment using the same catalyst, without zeolite. In addition, it is believed that the width of the NOx conversion trace is increased.

FIG. 3 shows a dip between two peaks. This is believed to be caused by the catalyst heating up to a temperature above the peak NOx conversion temperature.

Further tests have been carried out to compare the performance of 0.3 g of 1 wt % platinum on alumina powder which is blended with a further amount of alumina (0.3 g), with the same platinum on alumina powder blended with 0.3 g of ZSM-5 adsorbent. A modified FTP test for diesel engines, representing the middle section of the test, during which the exhaust gas temperature cycles between about 170° C. and 240° C., was performed. and the results are shown in FIG. 4. The lower set of traces show NOx conversion for the catalyst and ZSM-5 blend, and a standard calculation carried out by computer shows an average NOx conversion of 33.4%. The upper set of traces, for the catalyst and alumina powder, shows an average NOx conversion of 21.0%. In both sets of traces, the broken line represents temperature.

The test gas used in these tests, and in the following tests, was a model diesel exhaust consisting of 400 ppm propane, 200 ppm NOx (NO), 4.5% $CO_2$, 200 ppm CO, 20 ppm $SO_2$, 5% water vapour, 12.5% $O_2$ and the balance being $N_2$.

Additionally, the same test was carried out using a catalyst system more representative of a commercial system, that is a standard cordierite catalyst carrier, in the form of a monolith of 1 inch diameter and 1.5 inch length (25.4 mm diameter, 38.1 mm length), having 400 cells per square inch (400 cells/645.16 $mm^2$ or 0.62 cells/$mm^2$). The monolith carried 3g per cubic inch (3 g/16.39 $cm^3$ or 0.18 g/$cm^3$) of washcoat, which was either alumina or a 50/50 mixture of alumina and ZSM-5. The washcoated monolith carried platinum in an amount of 70 g/cubic foot of catalyst volume (70 g/28.32 liters or 2.5 g/liter). The average NOx conversion for the present invention, catalyst and adsorbent, was 29.4% (lower traces), whereas the average NOx conversion for the standard catalyst system was 16.4% (upper traces), and the results are shown in FIG. 5. In both sets of traces, the broken line represents temperature.

For both of the above tests, the average NOx conversion is much improved by the incorporation of an adsorbent.

The identical monoliths and powders used in the last-mentioned tests, were used for tests measuring NOx conversion, when the model exhaust gas was heated at a linear heating rate of 50° C./minute. The results are shown in FIG. 6, the upper set of traces being for the monoliths, and the lower set of traces being for the powders. In both sets of traces, the continuous line represents conversion by the catalyst and adsorbent, whereas the broken line represents conversion by the catalyst and alumina. In both cases, there is a very substantial improvement in peak NOx conversion and in aggregate NOx conversion, as shown by the areas under the curves, for the catalyst systems used in the present invention.

In all cases, NOx conversion was measured using a chemiluminescent analyser.

We claim:

1. A process for the improved conversion of $NO_x$ in the exhaust gases from a light-duty diesel engine using a lean $NO_x$ catalyst convertor in the exhaust system, characterized in that unburned hydrocarbons are:

adsorbed into an adsorbent in the catalytic convertor at temperatures below 190° C. during cooler parts of the operating cycle, are desorbed in the temperature range of 190° C. to 250° C. during hotter parts of the operating cycle, and by said desorption are thus combined with unburned hydrocarbons in the exhaust to form a combined exhaust stream which is at or below 250° C. in which at least a portion of the $NO_x$ is catalytically reduced to $N_2$ while said combined exhaust stream is simultaneously oxidized.

2. A process as claimed in claim 1, wherein the adsorbent is admixed with the catalyst.

3. A process as claimed in claim 1, wherein the adsorbent is admixed with a washcoat carried on a monolith.

4. A method for the improvement of aggregate $NO_x$ conversion in the exhaust gases from a light-duty diesel engine, said exhaust gases comprising CO, unburned hydrocarbons, and $NO_x$ wherein the temperature of said exhaust gases cycles below and above 190° C. a multiplicity of times during every engine operation, said method comprising:

adsorbing unburned hydrocarbons when said gas temperature is below 190° C.;

permitting adsorbed hydrocarbons to desorb when said gas temperature is in the range 190° to 250° C. such that said desorbed hydrocarbons combine with unburned hydrocarbons in the exhaust gases to form a combined exhaust stream, said combined exhaust stream at or below 250° C.; and catalytically reducing at least a portion of the $NO_x$ in the gases flowing from the engine while simultaneously oxidizing said combined exhaust stream.

5. A method for the improvement of aggregate $NO_x$ conversion in the exhaust gases from a light-duty diesel engine, said exhaust gases comprising CO, unburned hydrocarbons, and $NO_x$ wherein the temperature of said exhaust gases cycles, a multiplicity of times during every engine operation, from a cooler temperature to a hotter temperature, relative to an average exhaust gas temperature, wherein said hotter temperature includes the range from 190° C. to 250° C., and said exhaust gases are contacted with an $NO_x$ reducing catalyst which reversibly adsorbs unburned hydrocarbons and desorbs said hydrocarbons at a temperature in the range of 190° C.–250° C., said method comprising contacting said exhaust gases with said catalyst continuously throughout said cycles, said catalyst converter:

adsorbing unburned hydrocarbons when said gas temperature is below 190° C.;

desorbing said unburned hydrocarbons into said exhaust stream when said exhaust gas temperature is in the range 190° to 250° C., and simultaneously catalytically reducing at least a portion of the $NO_x$ in the gases flowing from the engine while simultaneously oxidizing said combined exhaust stream.

* * * * *